UNITED STATES PATENT OFFICE.

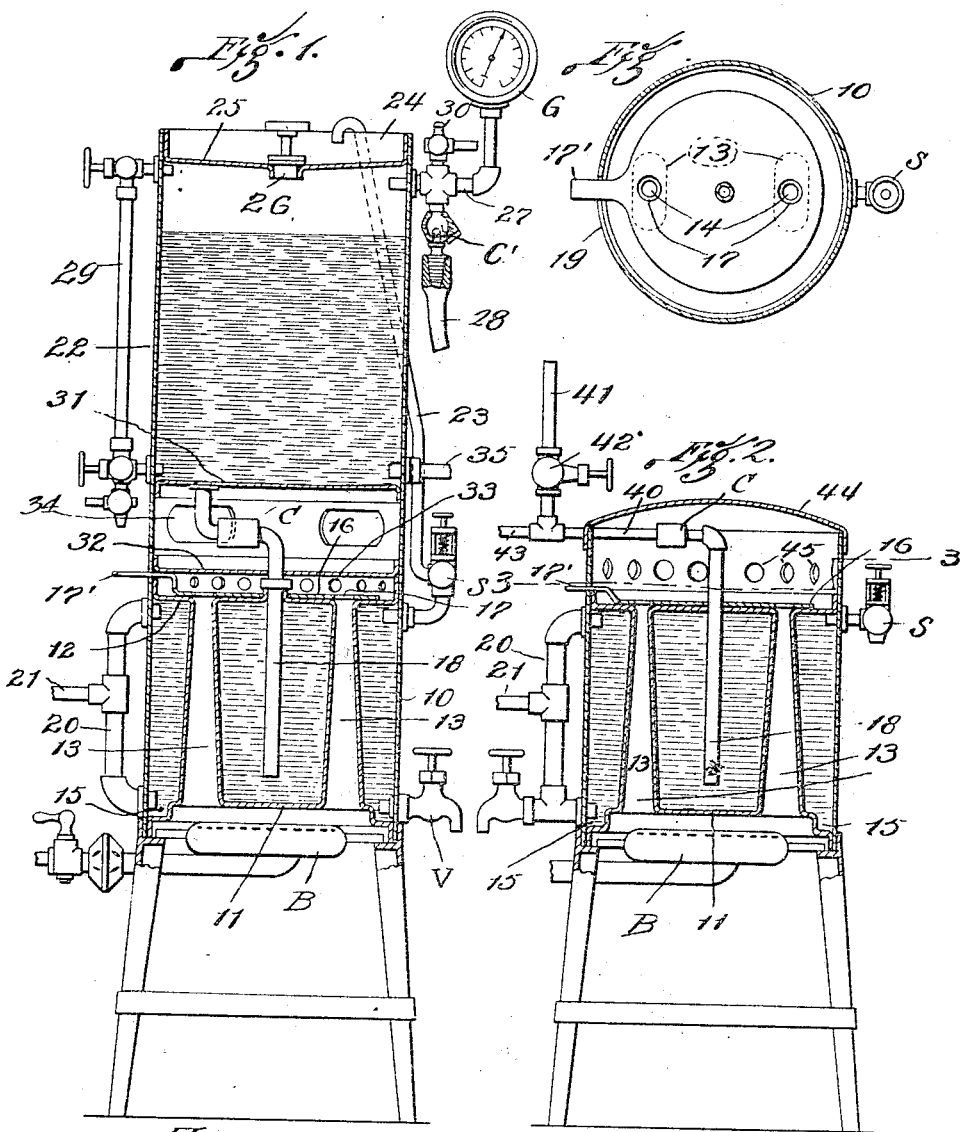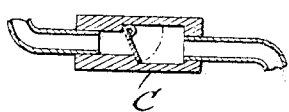

HARRY G. RUCKER, OF HILLSBORO, ILLINOIS.

WATER-HEATER.

1,288,206.　　　　　Specification of Letters Patent.　　Patented Dec. 17, 1918.

Application filed April 10, 1916.　Serial No. 90,255.

*To all whom it may concern:*

Be it known that I, HARRY G. RUCKER, a citizen of the United States, and resident of Hillsboro, Illinois, have invented certain new and useful Improvements in Water-Heaters, of which the following is a specification containing a full, clear, and exact description, reference being had to the accompanying drawings, forming a part hereof.

This invention relates to that class of water heaters in which small quantities of water may be heated without distributing or radiating any of the burner heat to the source of water-supply, irrespective of whether the latter be in the nature of a tank disposed above the heating-tank, or whether such supply be in the nature of force supplied by city water-mains, or the like.

One of the objects of my invention is to provide an improved water heater of the class mentioned; and it deals particularly with certain improvements upon the water heater shown and described in my United States Letters-Patent No. 1,070,846, granted to me on August 19, 1913.

A further object of my invention is to provide an improved water heater of the class referred to, in which the heat applied to the water-receptacle may be regulated, so that if little or no water be drawn from the container, the temperature of the water therein will be maintained uniform, without wasting any fuel or gas.

A further object of the invention is the provision of an improved water heater of the class mentioned, wherein if steam be generated in the container any excess pressure thereof may be permitted to escape therefrom, and the pressure in the tank may be regulated, as desired.

This last-mentioned feature of my invention refers especially to the device when used in connection with the city water-mains, which are usually working under higher pressure than is required for the purposes of the present device.

Further objects of the invention will hereinafter appear, and be particularly defined in the appended claims.

In the drawings,

Figure 1 is a central vertical section of a water-heater embodying my invention, in the form for use where city water-pressure is not available.

Fig. 2 is a similar section of my invention, in the form particularly adapted for use in connection with the city water-supply, under any desired pressure, and Fig. 3 is a horizontal section taken on line 3—3 of Fig. 2.

Fig. 4 is a detailed enlarged sectional view of the valve located in the supply pipe of the heating tank.

The numeral 10 indicates a heating-chamber which is adapted to contain a predetermined quantity of water, and the contents of which are heated by a burner B, which may be of any desired type and adapted for use either with gas or any volatile liquid fuel.

The bottom and crown sheets of said heating-chamber 10 are designated by 11 and 12, respectively, and are connected by flues 13, which, at their lower ends are preferably oval-shaped, as shown by dotted lines in Fig. 3, while they taper from their lower ends toward their upper ends, and terminate in small circular openings 14 in said crown-sheet 12.

Experience has demonstrated the fact that heat generated by said burner B is more efficiently taken advantage of by this construction, inasmuch as the heat generated by the gas will be maintained in said flues more uniformly throughout their entire length; and in order to avoid any waste of heat, such as is generally found in many stoves and common utensils, (such waste being due to the fact that considerable heat passes out from under the edges of such utensils) I form in the water heating-chamber 10 what may be termed an annular "water space" or "jacket" the inner wall of which is exposed to the heat which would otherwise tend to radiate from beneath the said heating-chamber. Such water jacket is indicated by the numeral 15, as constituting a portion of the said bottom sheet 11.

Disposed immediately above the upper surface of the said crown-sheet 12 is a damper-plate 16 having a pair of apertures 17 which may be brought into and out of registration with the heat openings 14, before mentioned, this damper-plate 16 being maintained for rotation on a centrally-disposed pipe 18 which constitutes the supply-pipe of the heating-tank; and said plate is provided with a suitable handle 17' for manipulation, a slot such as 19 (see Fig. 3) being provided in the shell or casing, for that purpose.

Under ordinary circumstances, the said plate 16 will be in the position shown, with the apertures 17 thereof registering with the said openings 14, in which case the burner can be turned on full and the flues obtain the maximum degree of heat, so that the contents of the tank will be heated very rapidly.

On the other hand, if water drawn from the tank should be very small in quantity, the water in said tank may be maintained at the desired temperature by regulating the flow of gas through the said burner, and at the same time throttling the outlet of the flues by a proper movement of said damper-plate.

In order to maintain a circulation of the water in said tank, I provide a pipe 20 which communicates with the interior of the tank at the top and bottom thereof, as clearly shown in Fig. 1; and water may be conducted to the place where it is to be used, as for instance, to a wash-basin, through a pipe 21.

The water contained in said annular "jacket" 15 is the hottest portion of the water, and inasmuch as this portion constitutes also the lowest part of the water-space of said tank, I provide a valve V through which the hot water may be drawn, and which at the same time will serve as a means for draining all the water from the tank, to prevent freezing when the heater is not in use and located in a cold room.

As previously stated, the device shown in Fig. 1 is especially adapted for use in localities where water under pressure is not available, and in order to maintain the said heating-tank supplied with water at all times, I provide a container, or reservoir, for said tank.

This reservoir is designated by the numeral 22, and is located directly above said tank, and is connected thereto by a feed-pipe 18, previously mentioned, so that water which has been poured into said reservoir can gravitate from the latter into said tank.

Said reservoir 22 is also intended to supply cold water at the basin or bowl, and in order to separate the two bodies of water from each other I provide in said pipe 18 a check-valve C (any of the well known valves may be employed as the specific construction thereof forms no part of my invention) which will permit the cold water to flow from the said reservoir 22 into said heating-tank but will prevent any return.

Likewise, the said check-valve will prevent any steam (which may be generated in said heating-tank) from finding its way into the reservoir; and in order to prevent the said heating-tank from bursting under pressure which may be generated therein by the burner while the outlet valve in the discharge-pipe 21 is closed, I provide a safety-valve S of any desired construction which will permit the steam to escape from said tank, and thence pass through a pipe 23 which terminates above said reservoir, so that the condensation of any steam may find a lodging place in a cup 24 formed by the upper plate 25 of said reservoir 22.

Water may be introduced into said reservoir by removing a plug 26 provided for that purpose, said plug being intended to tightly seal the inlet-opening and form an air-tight chamber in the upper portion of said reservoir.

The latter feature is important, because under ordinary circumstances the entire device stands on the floor, so that the water would not gravitate into the bowl or basin.

In order to obtain the necessary pressure in the upper part of said reservoir, above the water therein, I provide a pipe 27 connected to the uppermost portion of said reservoir, and supplied with a check-valve C' of any desired construction which will permit air under pressure to be introduced through a pump-pipe 28, or connection with a source of air under pressure, not shown, but will prevent any return thereof.

A gage G is also attached to the pipe 27 to determine the pressure within said reservoir.

A water-gage glass 29 is connected to the said reservoir, to indicate the level of the water therein.

In order to permit the air to escape from said reservoir 22 while fresh water is being introduced, through the plug opening, I provide a vent 30 which may be opened, but the same should of course be closed before any pressure is introduced by way of the said pump-pipe 28.

In Fig. 1 it will be noted that the bottom plate 31 of said reservoir is remote from the top plate 12 of said heating tank, in order to reduce the transmission of heat to the former; and in order to still further prevent such transmission of heat, I provide what may be termed a "dead plate" 32 disposed a short distance above the said damper-plate 16; and a series of openings 33 in the shell will permit the heat to escape into the atmosphere.

Furthermore, I provide vent-openings 34 in the walls of the space between the said "dead plate" 32 and the said bottom plate 31.

Cold water may be drawn from said reservoir 22 through a pipe 35 disposed near the bottom of said reservoir.

In localities where city water-pressure is available, the reservoir 22 can be dispensed with, and the water-supply introduced into the heating-tank by a pipe 40 (see Fig. 2) which receives its supply from a pipe 41, fitted with a valve 42.

Said pipe 41 has a branch-pipe 43, which may be used for various common purposes.

A hood 44 is used to inclose the upper part of the tank shell, and a series of openings 45 are provided to permit the escape of the products of combustion issuing from the flues 13, the construction of which is similar to that above-described in connection with the form of heater shown in Fig. 1.

Changes may be made in the general organization, as well as in the particular construction of some of the component parts of my improved water-heater, without departing from the spirit and scope of my invention, and while I have shown herein a heater of the vertical type it should be readily apparent that my invention may readily be applied to the horizontal type by a skilled mechanic.

I claim:—

1. A water heater comprising a heating tank, a supply tank located above said heating tank and spaced apart therefrom, a pipe for conducting the water from the supply tank to the heating tank, a check valve in said pipe, a burner disposed beneath the heating tank, oval-shaped tapering flues extending through the heating tank, a damper for controlling all of said flues, an imperforate plate located above the damper plate and below the supply tank, there being a series of heat exit openings between the damper and imperforate plate.

2. A water heater comprising an exterior casing, a heating tank located in the lower end thereof, a supply tank in the upper portion thereof, the said supply and heating tanks being spaced apart, a pipe in communication with the supply tank and the heating tank, a check valve located in said pipe, tapering flues extended through the heating tank, a burner positioned beneath the said flues, a damper plate for controlling the flues, an imperforate plate mounted in said exterior casing between the heating tank and the supply tank, there being a series of heat openings formed in said exterior casing above and below said imperforate plate.

3. A water heater comprising an exterior casing, a supply tank located in the upper portion of the casing, a heating tank in the lower portion of said casing and spaced apart from the supply tank, said casing forming the outer wall of both tanks, flues formed through the heating tank, a burner positioned beneath said flues, a pipe connecting the supply tank and heating tank, a check valve located therein, a damper plate for controlling said flues, an imperforate plate located above the damper plate, a series of openings formed in the exterior casing above and below said imperforate plate, a safety valve secured to the heating tank, and a condensing pipe between the safety valve and the supply tank for the excess steam generated in the heating tank.

4. A water heater comprising an exterior casing, a supply tank and heating tank located therein, the said tanks being spaced apart, an imperforate plate between said tanks, a series of openings formed in the casing above and below said imperforate plate, a centrally disposed pipe communicating with the supply tank and heating tank, a check valve located therein, flues formed through the heating tank, a damper plate for said flues, a burner, a safety valve connected with the heating tank, and a pipe for the excess steam leading from the safety valve to the top of the supply tank.

In testimony whereof, I have signed my name to this specification, in presence of two subscribing witnesses.

HARRY G. RUCKER.

Witnesses:
ALICE C. KIBURTZ,
R. C. ORWIG.